Sept. 2, 1941.    T. A. WOOD    2,254,338
METAL ROLLING MILL MOTOR CONTROL
Filed June 5, 1940
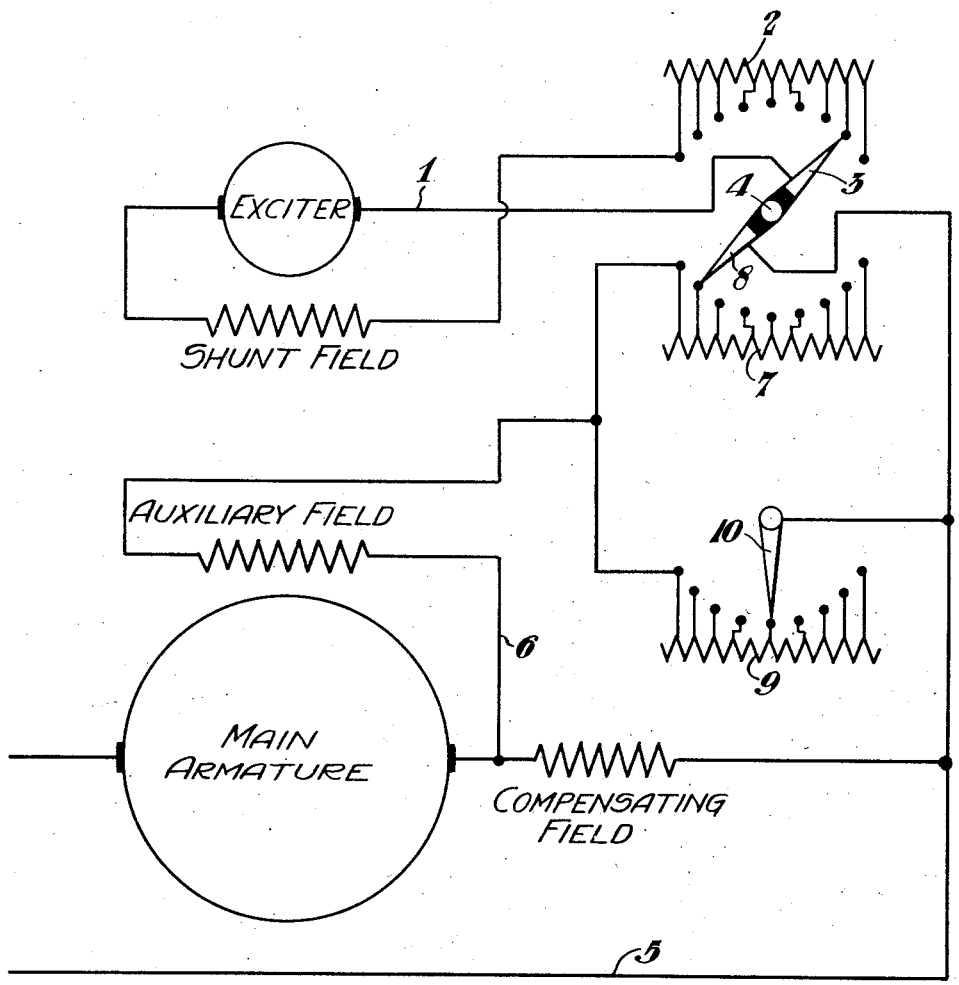
Inventor:
THORNTON A. WOOD,
by: John E. Jackson
his Attorney.

Patented Sept. 2, 1941

2,254,338

UNITED STATES PATENT OFFICE 2,254,338

METAL ROLLING MILL MOTOR CONTROL

Thornton A. Wood, Gary, Ind.

Application June 5, 1940, Serial No. 339,021

1 Claim. (Cl. 172—239)

This invention is particularly concerned with the regulation of direct current electric motors used to power the working rolls of metal rolling mills.

The problem of regulating these motors has not been adequately solved by prior art arrangements, motor speed variations in the case of strip mills, for instance, being particularly troublesome. One reason for speed regulation difficulties is that although a direct current motor of the shunt field type is capable of being accurately regulated under many conditions, the rapid speed and load variations encountered in metal rolling mill service cause troubles, and one of these arises from motor instability of operation.

In the interest of providing better speed regulation, a shunt field motor of the rolling mill type is commonly provided with a compensating field winding in series circuit with the motor armature and which functions to prevent distortion of the field due to armature reaction. In addition to this, an auxiliary field is commonly provided, this being energized by being in shunt circuit with the compensating field winding and intended to prevent unstable motor operation.

The usual arrangement is to provide a rheostat having two banks of resistance, one bank being in series with the energizing circuit of the shunt field of the motor, and the other bank being in series with the auxiliary field circuit, a common controlling element functioning to add resistance to the shunt field circuit while simultaneously removing resistance from the auxiliary field circuit or vice versa. The rheostat is constructed to perform these two functions so that the one function is entirely dependent on the other, the motor operator having no control whatsoever over the interrelation of the two functions. By correlating the two functions, the auxiliary field current is increased in proper proportion to decreases in the shunt field current to prevent unstable operation due to armature speed changes.

Although this prior art arrangement provides control in the case of changes in the armature speed, it does not provide control when the armature load varies as it does in the case of a metal rolling mill motor. The present invention is intended to provide adequate control when the armature load varies as it does in the case of this type of motor application.

According to the invention, a second rheostat is placed in the auxiliary field circuit in parallel circuit with the bank of resistance provided this circuit by the previously discussed rheostat. This second rheostat is entirely independent of the other and provides for placing independently variable amounts of resistance parallel that which the other rheostat variably places in the auxiliary field circuit in accordance with the resistance variations in the shunt field circuit.

With such an arrangement load variations on the motor may be compensated by the motor operator, this being impossible in the case of the usual arrangement. That is to say, with the usual arrangement an armature reaction due to a load variation which weakens the shunt field to such an extent that the motor speed increases, is an uncontrollable action, but by the use of the present invention the auxiliary field strength can be increased by the motor operator as required to maintain a constant motor speed, the auxiliary field strength now being variable as required for the purpose whereas it was formerly only variable dependently upon a variation in the field strength during deliberate motor speed changes.

The foregoing is illustrated by the accompanying diagram.

This diagram shows the exciter energizing the motor shunt field through a circuit 1 in which variable amounts of the resistance 2 may be placed by a contactor 3 turned by a shaft 4, this providing motor speed changes as required. The compensating field winding is in series with the armature circuit 5 and the auxiliary field is in shunt connection with the compensating field winding by way of the shunt circuit 6 which includes the resistance 7 in series therewith, variable amounts of the resistance 7 being placed in the circuit by a contactor 8 turned by the shaft 4. As previously explained, the contactors 3 and 8 move dependently in accordance with rotation of the shaft 4, the arrangement being so that as the resistance 2 is increased in the circuit 1, the resistance 7 is decreased in the circuit 6, this preventing motor instability due to changes in the armature speed. However, it does not prevent unstable motor operation due to variations in the armature load.

In accordance with the invention, a second rheostat independent of the first is used, this including the resistance 9 in the circuit 6 parallel the resistance 7 and of which variable amounts are placed in the circuit by a contactor 10. It is to be emphasized that the operation of the contactor 10 is entirely independent of the operation of the contactors 3 and 8.

With the arrangement shown by the diagram, the motor speed is set by operation of the contactor 3, this automatically and simultaneously adjusting the auxiliary field strength to control the armature speed droop characteristic in so far as the motor speed adjustment is concerned. Then, should the armature load suddenly vary as it does in rolling mill applications, the operator is free to adjust the contactor 10 as required to increase or decrease the auxiliary field strength to control the armature speed droop characteristic resulting from armature load variations, this having been impossible before.

I claim:

A metal rolling mill motor having a shunt field for controlling its armature speed and an auxiliary field for controlling its armature speed droop characteristics, the motor having a compensating field with which the auxiliary field is in shunt circuit and the circuits of both the shunt and auxiliary fields including means for placing variable amounts of resistance in series with each with the amount placed in the one circuit dependent on the amount placed in the other so as to control the armature speed while automatically controlling the armature speed droop characteristic resulting from armature speed variations, and the auxiliary field circuit also including means for placing variable amounts of resistance in parallel circuit with the resistance placed therein by the first named means so as to control the armature speed droop characteristic resulting from load variation, the two means being respectively independent.

THORNTON A. WOOD.